May 8, 1962 W. F. ALLER 3,033,022
GAGING APPARATUS FOR BEARINGS
Filed April 26, 1960 2 Sheets-Sheet 1
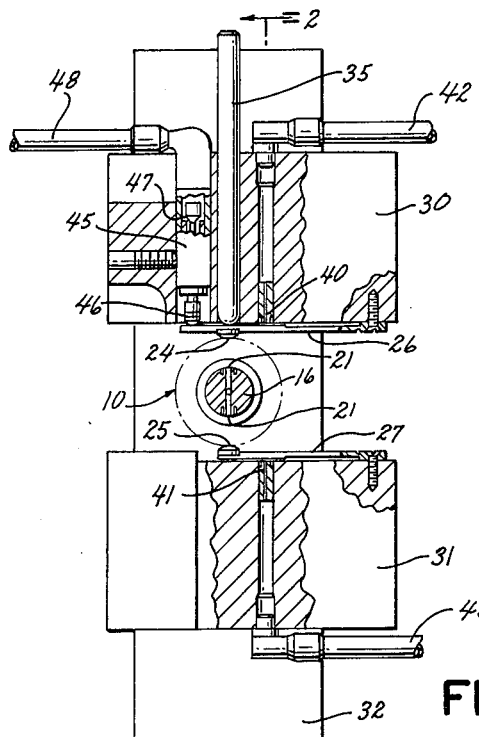
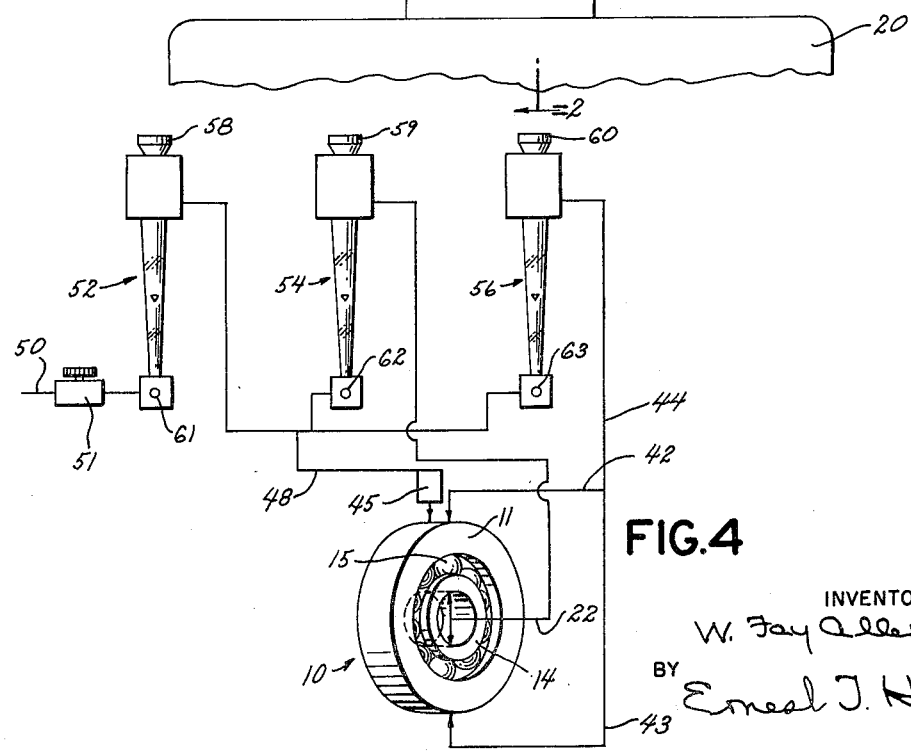
INVENTOR
W. Fay Aller
BY
Ernest J. Hix
ATTORNEY May 8, 1962 W. F. ALLER 3,033,022
GAGING APPARATUS FOR BEARINGS
Filed April 26, 1960 2 Sheets-Sheet 2
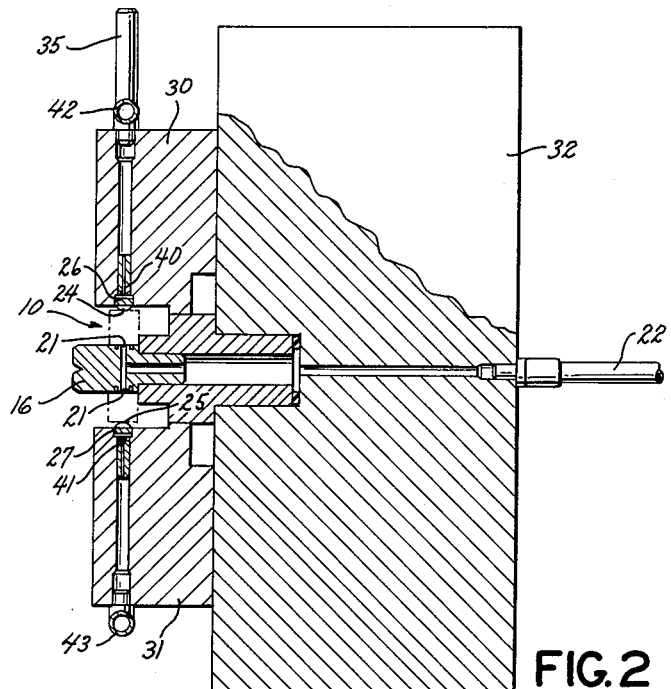
FIG. 2
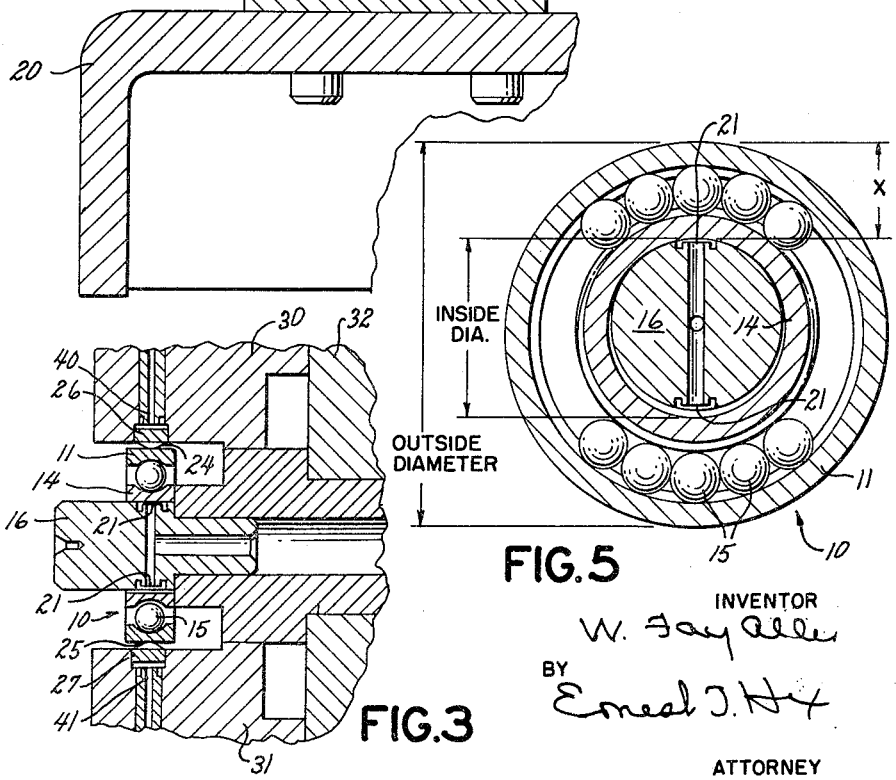
FIG. 5
FIG. 3
INVENTOR
W. Fay Aller
BY
Ernest J. Hy
ATTORNEY

ND PATENT OFFICE 3,033,022
Patented May 8, 1962

3,033,022
GAGING APPARATUS FOR BEARINGS
Willis Fay Aller, Dayton, Ohio, assignor to The Sheffield Corporation, Dayton, Ohio, a corporation of Delaware
Filed Apr. 26, 1960, Ser. No. 24,693
10 Claims. (Cl. 73—37.8)

This invention relates to gaging apparatuses and more particularly to an apparatus for measuring the radial play of bearing assemblies.

In bearing assemblies having inner and outer rings, and particularly in ball bearing assemblies and the like, a critical condition which must be measured is that of radial play between the inner and outer bearing rings.

In one prior known apparatus for making this measurement the inner ring is clamped in position, opposing forces sequentially applied to the outer ring, and a measurement made of the movement of the outer ring relative to the inner from one extreme to the other. In a later development, to avoid distortion of the inner ring, the inner ring is loosely applied to a spindle and the distance between the inner and outer rings measured at one side of the spindle axis with a force applied to the outer ring in one direction along the line of measurement. The force was then applied in the opposite direction and a second measurement made. In both of these approaches through computation the radial play is determined from the two measurements obtained. Other critical dimensions of the bearing assemblies have been measured through separate gaging devices, each with its own complete gaging system.

It is accordingly an object of the present invention to provide an apparatus for measuring radial play of bearing assemblies with high precision and increased speed over prior to known apparatuses.

It is a further object to provide such an apparatus wherein in a single unit critical dimensions of a bearing assembly are measured individually and are simultaneously correlated for a measurement of radial play, eliminating the necessity for sequential operations or separate gaging devices.

It is a further object to provide a gaging apparatus for measuring radial play in a bearing assembly without distortion of the rings or other bearing components and in a single positioning of the assembly, thus providing precise gaging results and eliminating the necessity for sequential reverse force applications while giving a single indication of the radial play condition of the assembly.

It is a further object of this invention to provide such an apparatus including sensing means for simultaneously measuring the diameter of the inner ring bore, the external diameter of the outer ring, and the distance between the surfaces of the inner ring bore and external periphery of the outer ring at a location of maximum eccentricity, measuring means being included simultaneously responsive to said sensing means and to the radial play of the gaged assembly.

It is a further object to provide such an apparatus wherein from a single supply passage exhausts to atmosphere through branch passages controlled respectively in accordance with the diameter of the inner ring bore and the external diameter of the outer ring, a further branch passage being provided which is controlled in accordance with the distance between the inner and outer rings at one side of the bearing axis, measuring means being provided in the supply passage responsive to the total flow through said passages and to the radial play of the assembly; further measuring means being provided in the branch passages for external diameter and bore diameter measurement as desired.

Other objects and advantages of the present invention will be apparent from the following description, the appended claims, and the accompanying drawings, in which, FIGURE 1 illustrates in elevation and partial section an exemplary apparatus embodying the present invention, FIGURE 2 is a sectional view taken on line 2—2 of FIGURE 1, FIFGURE 3 is an enlarged portion of FIGURE 2 showing a bearing in position to be measured, FIGURE 4 is a diagrammatic illustration of a pneumatic gaging circuit used with the exemplary apparatus, and FIGURE 5 is a sectional view of a ball bearing assembly indicating critical dimensions involved in operation of the present apparatus.

Radial play or internal clearance of anti-friction bearings is basically the total diametral movement of an unclamped ring relative to a fixed ring of the bearing assembly when a specified diametral load is applied and reversed. As previously mentioned, this is normally measured by restraining one ring, alternately applying reverse diametral forces to the other, measuring the two relative positions obtained, and computing the resulting radial play.

However, with bearing components having dimensions within certain predetermined limits, the radial play can be computed by the following formula:

$$\text{Radial play} = \left( \frac{\text{O.D.} - \text{I.D.}}{2} - X \right)$$

Where (see FIGURE 5) O.D. is maximum diameter of the outer ring, I.D. is the bore diameter of the inner ring, and X is the minimum distance between the surfaces of the inner ring bore and the external periphery of the outer ring at one side of the bearing axis along a diametral line of extreme relative eccentricity between the rings.

The present invention employs the relationship indicated by this formula to obtain a measurement of radial play with a single positioning of the bearing components while simultaneously providing measurements of other critical bearing dimensions, all in a common gaging apparatus.

While the illustrated example of the present invention involves measurements of a ball bearing through a particular exemplary apparatus, it will be appreciated by those skilled in the art that the invention would have application to other type bearing assemblies and involve materially different apparatus constructions.

In application of the present invention the inner and outer rings of a bearing assembly are disposed in extreme relative eccentricity along a diametral line. Sensing means are provided for simultaneously measuring the diameter of the inner ring bore, the external diameter of the outer ring, and the distance between the surfaces of the inner ring bore and external periphery of the outer ring at one side of the bearing axis and along the line of dimetral eccentricity. These measurements are automatically and simultaneously correlated to provide a single indication or measurement of the radial play of the bearing assembly. If desired, the individual dimensions can be indicated or measured at the same time.

In operation of the present apparatus relative eccentricity between the inner and outer surfaces of the rings or ovality of the components will be reflected in the measurement made. This composite measurement has advantages in many circumstances because eccentricity, ovality, and radial play all have similar effects upon the operating characteristics of the bearing. Ordinarily, however, because of the tolerances maintained in bearing manufacture these other characteristics will not affect the radial play measurement to an extent requiring consideration. Because of the unique approach involved in this apparatus it is possible in borderline cases to segregate eccentricity and ovality from the radial play measurement obtained.

This is accomplished by relatively rotating the inner and outer rings while in gaging position and noting the radial play variation which results. Variations obtained during rotation will be solely due to these supplemental characteristics. Thus, if desired, other characteristics affecting the reading can be easily segregated.

Referring particuarly to the drawings, FIGURE 5 illustrates an exemplary ball bearing assembly 10 which includes outer ring 11, inner ring 14, and anti-friction balls 15 assembled therebetween.

As shown in FIGURE 5 the bearing rings are in a position of extreme diametral eccentricity in a vertical measuring plane, with the inner ring 14 engaging a supporting spindle 16. As seen in FIGURES 1, 2 and 3 spindle 16 is supported on column 32 extending upward from an apparatus base 20. Spindle 16 has opposed orifices 21 at the exhaust ends of a measuring conduit 22 leading from a pneumatic circuit to be later described. Exhaust from orifices 21 is controlled by the bore diameter (I.D.) of inner ring 14 to provide a measurement of this dimension.

The outer periphery of outer ring 11 is engaged at diametrically opposite points in the gaging plane by upper and lower gaging contacts 24 and 25 respectively supported by leaves 26 and 27. Leaves 26 and 27 are relatively positioned in accordance with the diameter of the outer periphery of the outer ring and swing about reduced sections adjacent their right hand ends as they appear in FIGURE 1.

Upper and lower gaging supports 30 and 31 on column 32 mount leaves 26 and 27. A force-applying plunger 35 is guided for vertical sliding in the gaging plane by support 30. The lower end of plunger 35 engages the upper surface of leaf 26. Where precisely equal repeated forces are required, a spring or other constant pressure force applying means can be used. Downward force on plunger 35 is transmitted by leaf 26 to the outer periphery of ring 11 in opposition to spindle 16 so that the inner and outer rings are then positioned in extreme relative eccentricity along that line. Thus the bearing components assume their positions for gaging and further movement is not necessary for the normal gaging operation through the unique functioning of the present apparatus.

Measuring orifices 40 and 41 are provided in upper and lower supports 30 and 31 in opposition to the outer surfaces of leaves 26 and 27. Air is supplied to both orifices 40 and 41 from the pneumatic measuring circuit through a common conduit 44 and branch conduits 42 and 43. Thus, through the action of leaves 26 and 27 in cooperation with orifices 40 and 41, the flow through supply conduit 44 is determined by the outer diameter (O.D.) of outer ring 11.

A pneumatic gaging cartridge 45, which can be of a character disclosed in Patent No. 2,831,257, issued April 22, 1958, is mounted in upper support 30. It includes a slidable plunger positioned by engagement of contact 46 with leaf 26 and controlling flow through an orifice 47 included within the cartridge. This cartridge controls the flow through supply conduit 48 "reversely." That is to say, when the plunger moves outwardly the flow is reduced and when it moves inwardly flow is increased. Leaf 26 is positioned in accordance with the distance "X" across inner ring 14 and outer ring 11 in the gaging plane and flow through conduit 48 is controlled in accordance with this characteristic of the measured assembly.

Thus, in this exemplary pneumatic application of the present invention, flow changes are obtained to provide simultaneous measurement of the dimensions required under this unique approach.

FIGURE 4 shows an exemplary pneumatic circuit by which the measured diameters can be individually indicated and all the measured dimensions properly correlated for a single measurement of radial play of assembly 10. This circuit includes a supply connection 50 and a supply regulator 51. The indications are provided by column instruments 52, 54 and 56 which can be of a character illustrated and described in more detail in Patent No. 2,749,742, issued June 12, 1956. Instruments 52, 54 and 56 respectively include relief adjustments 58, 59, 60 and by-pass amplification adjustments 61, 62 and 63 by means of which their responses can be relatively adjusted with suitable masters to obtain reference indications. Basically this circuit, as with most other precision measurement circuits, is a comparator in operation.

The respective indications are provided by indicating floats movable vertically in transparent flow tubes included in each of instruments 52, 54 and 56. Suitable scales are provided in a known manner. The total flow passing through conduit 44 is determined by the external diameter (O.D.) of outer ring 11 as previously described. This flow passes through instrument 56 and thus this instrument responds to that dimension. Similarly the flow through conduit 22 and instrument 54 is determined by the diameter of the inner ring bore (I.D.) in the gaging plane and this dimension is indicated by the float position along the tube of the instrument. In this manner independent indications are simultaneously obtained of these two bearing dimensions.

It will be noted that the total flow through all of the sensing means passes through the tube of instrument 52. Through proper correlation of the individual circuits including that of cartridge 45 the necessary characteristics are reflected through flow changes and are correlated in the indication of instrument 52 for a radial play indication. With a single positioning of assembly 10 two diametral measurements as well as a radial play measurement are simultaneously obtained.

As previously discussed, if desired, eccentricity or ovality can be segregated by relatively rotating the rings while in gaging position. For example, by holding inner ring 14 stationary and rotating outer ring 11, fluctuations in the indication of instrument 52 will show variations in these dimensions of the rotated element. By noting the instrument fluctuations with one component held stationary while rotating the other and then reversing the procedure these characteristics can be segregated from the radial play measurement for a full study of assembly 10. It should be understood of course that where the manufacturing precision of individual components is satisfactory or where these extra dimensions are not critical this further process would not be necessary.

Thus it is seen that an apparatus for measuring dimensional characteristics of a bearing assembly has been provided which, through its unique construction and operation, makes possible in a single positioning of the assembly a measurement of radial play or internal clearance. Simultaneously, if desired, measurements can be made of other critical dimensions. Through operation of the apparatus a thorough analysis of the assembly can also be obtained.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Apparatus for measuring dimensional characteristics of a bearing assembly including inner and outer bearing rings, said apparatus comprising support means carrying the assembly and disposing the inner and outer rings one within the other, force applying means for disposing the rings in extreme relative eccentricity along a diametral line, sensing means simultaneously responsive to the diameter of the inner ring bore, the external diameter of the outer ring, and the distance between the surfaces of the inner ring bore and external periphery of the outer ring at one side of the bearing axis and along said diametral line with the rings disposed in extreme relative eccentricity along the diametral line, and measuring means operatively connected to all said sensing means for obtaining a single measurement through automatic comparison of the simultaneously responsive sensing means.

2. Apparatus for measuring dimensional characteristics of a bearing assembly including inner and outer bearing rings, said apparatus comprising a base, support means carrying the assembly and disposing the inner and outer rings in extreme eccentricity along a diametral line, said support means including a spindle for entrance within the inner bearing ring, sensing means on said base and said spindle including means simultaneously responsive to the diameter of the inner ring bore, the external diameter of the outer ring, and the distance between the surfaces of the inner ring bore and the external periphery of the outer ring at one side of the bearing axis and along said diametral line, and measuring means operatively connected to said sensing means simultaneously responsive to the measured characteristics of said assembly for automatically obtaining a single measurement determined thereby.

3. An apparatus as set forth in claim 2 further including means supporting all said sensing means on said spindle and said base in cooperating relationship along said diametral line of extreme relative eccentricity.

4. An apparatus as set forth in claim 2 wherein said sensing means include air leakage orifices exhausting to atmosphere in accordance with the measured characteristics of the bearing assembly, a common supply passage to all said orifices and a single indicator in said supply passage responsive to the total flow through the measuring orifices.

5. An apparatus as set forth in claim 2 wherein said supporting spindle extends through the inner ring bore with clearance, said support means including means for maintaining the bearing assembly compressed against one side of said spindle along the diametral line passing through the center of the spindle axis, said sensing means being responsive to dimensional characteristics of the bearing assembly in a plane including said diametral line and the axis of said spindle.

6. Apparatus for measuring dimensional characteristics of a bearing assembly including inner and outer bearing rings, said apparatus comprising support means carrying the assembly and disposing the inner and outer rings in extreme relative eccentricity along a diametral line, means providing a supply passage for connection to a source of air under pressure, a pressure regulator in said supply passage, a plurality of branch passages communicating with said supply passage, and leakage orifice gaging means at the terminal ends of said branch passages controlled by and exhausting to atmosphere in accordance with the diameter of the inner ring bore, the external diameter of the outer ring, and the distance between the surfaces of the inner ring bore and external periphery of the outer ring at one side of the bearing axis and along said diametral line, and indicating means in said supply passage responsive to the total flow to said leakage orifice gaging means to show the interrelated measured characteristics of the gaged bearing assembly.

7. Apparatus for measuring dimensional characteristics of a bearing assembly including inner and outer bearing rings, said apparatus comprising support means carrying the assembly and disposing the inner and outer rings in extreme relative eccentricity along a diametral line, sensing means for measuring dimensional characteristics of said assembly when so supported, said sensing means including first orifice means exhausting to atmosphere in accordance with the diameter of the inner ring bore, second orifice means exhausting to atmosphere in accordance with the external diameter of the outer ring, and orifice means controlled in accordance with the distance between the surfaces of the inner ring bore and external periphery of the outer ring at one side of the bearing axis and along said diametral line, means providing a supply passage for connection to a source of air under pressure, a regulator in said supply passage, branch passages from said supply passage to each of said orifice means, and an indicator in said supply passage responsive to the total flow to said orifice means.

8. Apparatus as set forth in claim 7 further comprising indicating means in the branch passages to the first and second gaging means respectively responsive to the diameter of the inner ring bore and the external diameter of the outer ring.

9. Apparatus for measuring dimensional characteristics of a bearing assembly including a base, a gaging spindle for loosely receiving the bore of the inner bearing ring, said spindle having a major component of horizontal disposition, force applying means on said base for urging the outer bearing ring downward toward said spindle and disposing the inner and outer ring in extreme relative eccentricity along a vertical diametral line, means providing a supply passage for connection to a source of air under pressure, a pressure regulator in said supply passage, a first branch passage from said supply passage, said spindle including leakage orifice means controlled in accordance with the diameter of the inner ring bore and connected to said first branch passage for increased flow therethrough with increases in bore diameter, a second branch passage from said supply passage, leakage orifice means on said base controlled by the diameter of the external surface of the outer ring for decreased flow through said second branch passage with increases in the diameter of the measured surface, a third means providing leakage orifice means connected to said supply passage upstream of said first and second branch passages and controlled to provide increased leakage to atmosphere with increases in the distance between the surfaces in the inner ring bore and external periphery of the outer ring at the upper side of the bearing axis and along said vertical diametral line, indicating means respectively provided in said first and second branch passages for indicating the diameter of the inner ring bore and the external diameter of the outer ring, and further indicating means in said supply passage upstream of said third means responsive to the total flow through said supply passage.

10. An apparatus as set forth in claim 9 wherein said leakage orifice means are situated in a common vertical plane passing through the axis of said spindle.

References Cited in the file of this patent

UNITED STATES PATENTS

| | | |
|---|---|---|
| 2,525,068 | Ericson et al. | Oct. 10, 1950 |
| 2,636,379 | Van Dorn | Apr. 28, 1953 |
| 2,675,621 | Mims | Apr. 20, 1954 |
| 2,746,159 | Aller | May 22, 1956 |
| 2,749,742 | Aller | June 12, 1956 |
| 2,831,257 | Aller | Apr. 22, 1958 |